(12) United States Patent
Hemphill et al.

(10) Patent No.: US 8,974,161 B1
(45) Date of Patent: Mar. 10, 2015

(54) REMOVABLE BULL RING WITH ROTATING ATTACHMENT PLATE

(71) Applicant: Ford Global Technologies, LLC, Dearborn, MI (US)

(72) Inventors: Joshua Hemphill, Trenton, MI (US); Scott Aaron Ford, Plymouth, MI (US); Philip Van Wyk, Burien, WA (US); Beck Alan Oiness, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/023,520

(22) Filed: Sep. 11, 2013

(51) Int. Cl.
*B60P 7/08* (2006.01)

(52) U.S. Cl.
CPC .................... *B60P 7/0807* (2013.01)
USPC .......................... 410/106; 410/110

(58) Field of Classification Search
USPC ............... 410/101, 106, 110, 116; 24/115 K, 24/265 CD; 248/499
See application file for complete search history.

(56) References Cited

U.S. PATENT DOCUMENTS

| | | | |
|---|---|---|---|
| 3,779,502 A | 12/1973 | Marberg | |
| 5,738,471 A | 4/1998 | Zentner et al. | |
| 5,971,683 A | 10/1999 | Hunt | |
| 6,142,718 A * | 11/2000 | Kroll | 410/106 |
| 6,374,466 B1 | 4/2002 | Macias | |
| 2012/0189398 A1 | 7/2012 | Grone | |

OTHER PUBLICATIONS www.etrailer.com/Truck-Bed-Accessories/Erickson/EM4001.html, Jun. 28, 2013, pp. 1-8.

* cited by examiner

*Primary Examiner* — Stephen Gordon
(74) *Attorney, Agent, or Firm* — Raymond Coppiellie; Price Heneveld LLP

(57) ABSTRACT

A bull ring for a vehicle comprises a top plate coupled to a rotating plate having a tie-down. Two opposing rail flanges extend from the rotating plate and a fastener selectively couples the rotating plate in a securing position relative to the top plate. The rail flanges extend beyond an outer edge of the top plate to define a clamping region with the top plate.

20 Claims, 18 Drawing Sheets

US 8,974,161 B1

REMOVABLE BULL RING WITH ROTATING ATTACHMENT PLATE

FIELD OF THE INVENTION

The present invention generally relates to a bull ring tie-down for a vehicle, more specifically, a removable bull ring tie-down having a rotational fastening mechanism.

BACKGROUND OF THE INVENTION

Various models of cargo vehicles, including pick-up trucks, include bed side rails that have stake pockets defined therein. Various accessories can be inserted into these stake pockets, such as bull rings that can be secured to the bed side rail to be used to tie down cargo that is placed within the bed of a pick-up truck. Typically, these bull rings are installed within stake pockets through the use of tools and are not readily removable absent the use of tools. In this manner, removal of the bull rings, such that alternate accessories can be inserted within the stake pocket, can be inconvenient due to the need for tools to remove and insert the various accessories.

SUMMARY OF THE INVENTION

According to one aspect of the present invention, a bull ring for a vehicle stake pocket or standard interface plate includes a top plate, a rotating plate rotationally coupled with the top plate, and a U-shaped tie-down. A fastener is configured to secure the rotating plate in a securing position relative to the top plate. Two opposing rail flanges of the rotating plate extend beyond the top plate and define a clamping region with the top plate.

According to another aspect of the present invention, a bull ring for a vehicle stake pocket or standard interface plate includes a top plate coupled to a rotating plate having a tie-down. Two opposing rail flanges extend from the rotating plate. A fastener selectively couples the rotating plate in a securing position relative to the top plate. The rail flanges extend beyond an outer edge of the top plate to define a clamping region with the top plate.

According to another aspect of the present invention, a bull ring for a vehicle stake pocket or standard interface plate includes a top plate coupled to a rotating plate having a tie-down. Two opposing rail flanges extend from the rotating plate, and a fastener selectively couples the rotating plate in a securing position relative to the top plate. The rail flanges extend beyond an outer edge of the top plate to define a clamping region with the top plate. A vehicle having a cargo bed side rail defines a pocket opening, wherein the two rail flanges and the rotating plate are configured to pass through the pocket opening when the two rail flanges are substantially aligned with a primary axis of the pocket opening. A portion of the bed side rail proximate the pocket opening is selectively disposed within the clamping region when the rotating plate is passed through the pocket opening and in the securing position. The tie-down is selectively secured proximate the bed side rail.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 3:
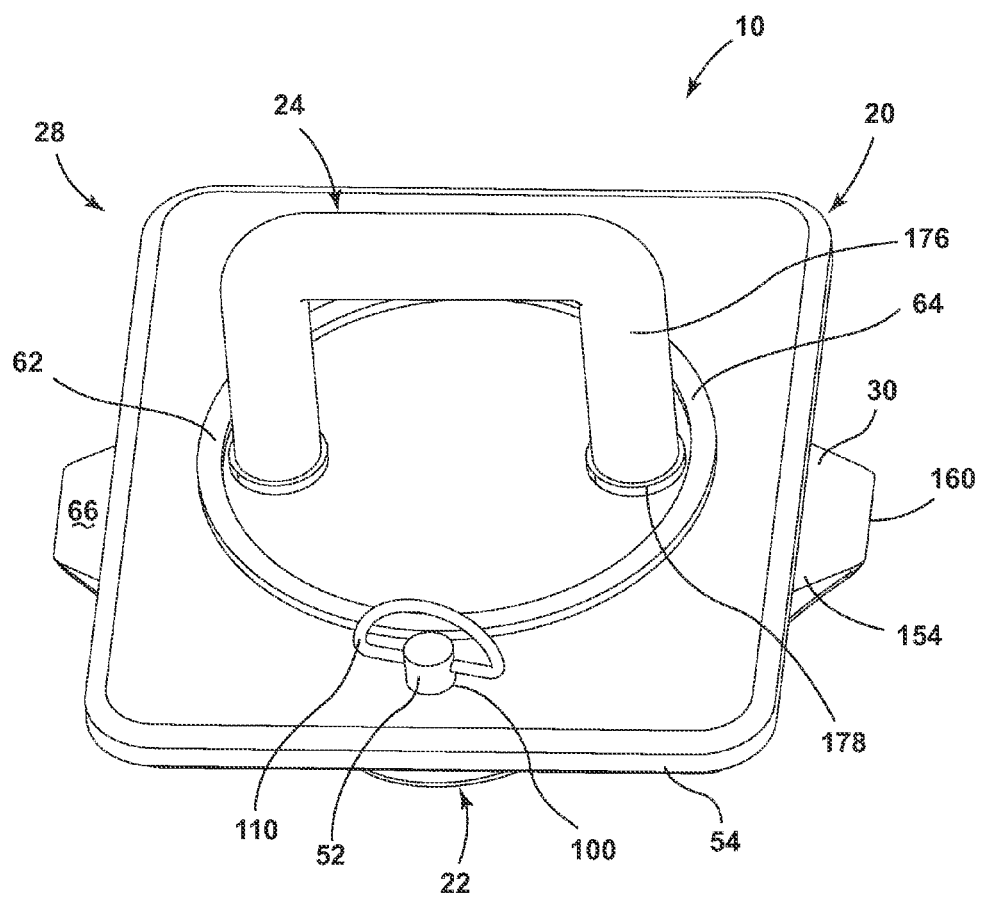
FIG. 3 is a top perspective view of an embodiment of the removable bull ring in the secured position.
Figure 4:
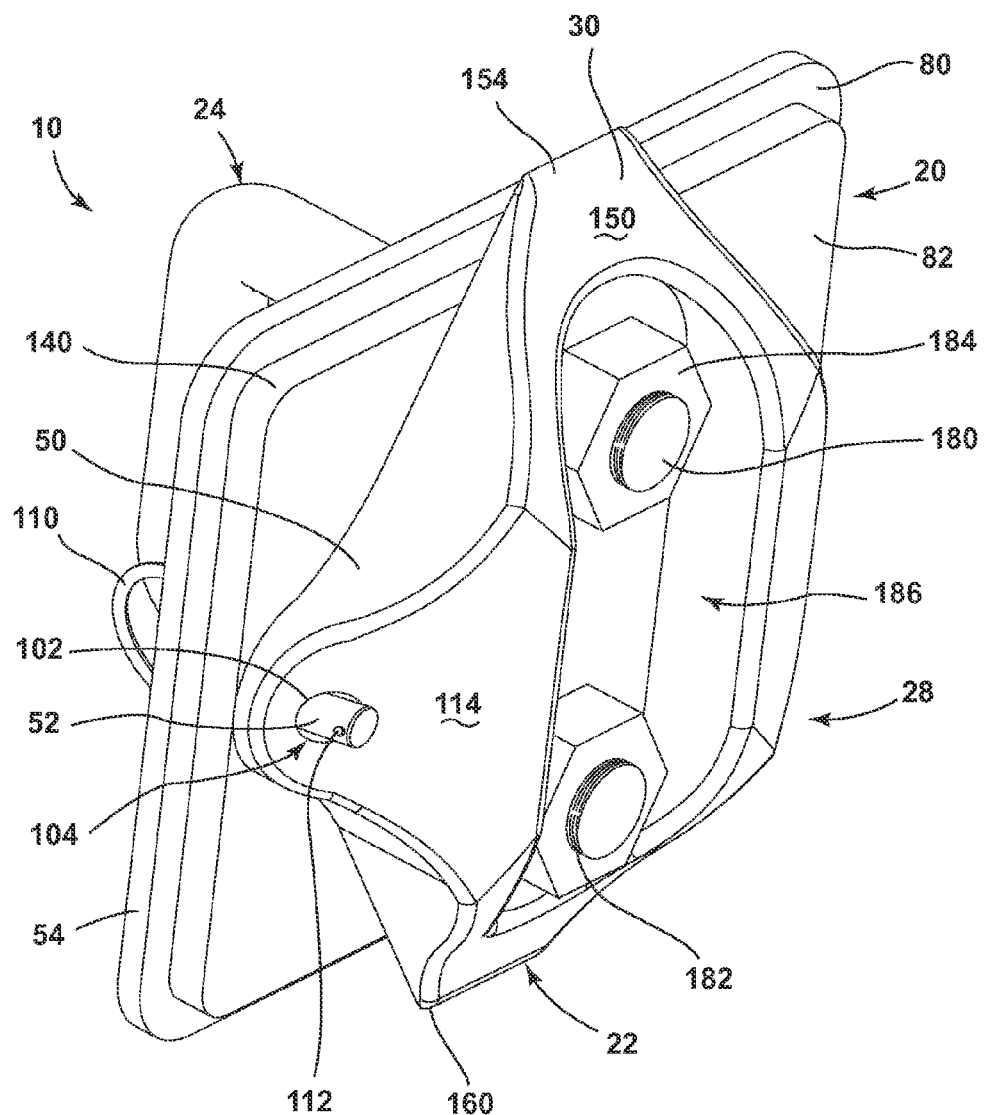
FIG. 4 is a bottom perspective view of the removable bull ring of FIG. 3.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 11:
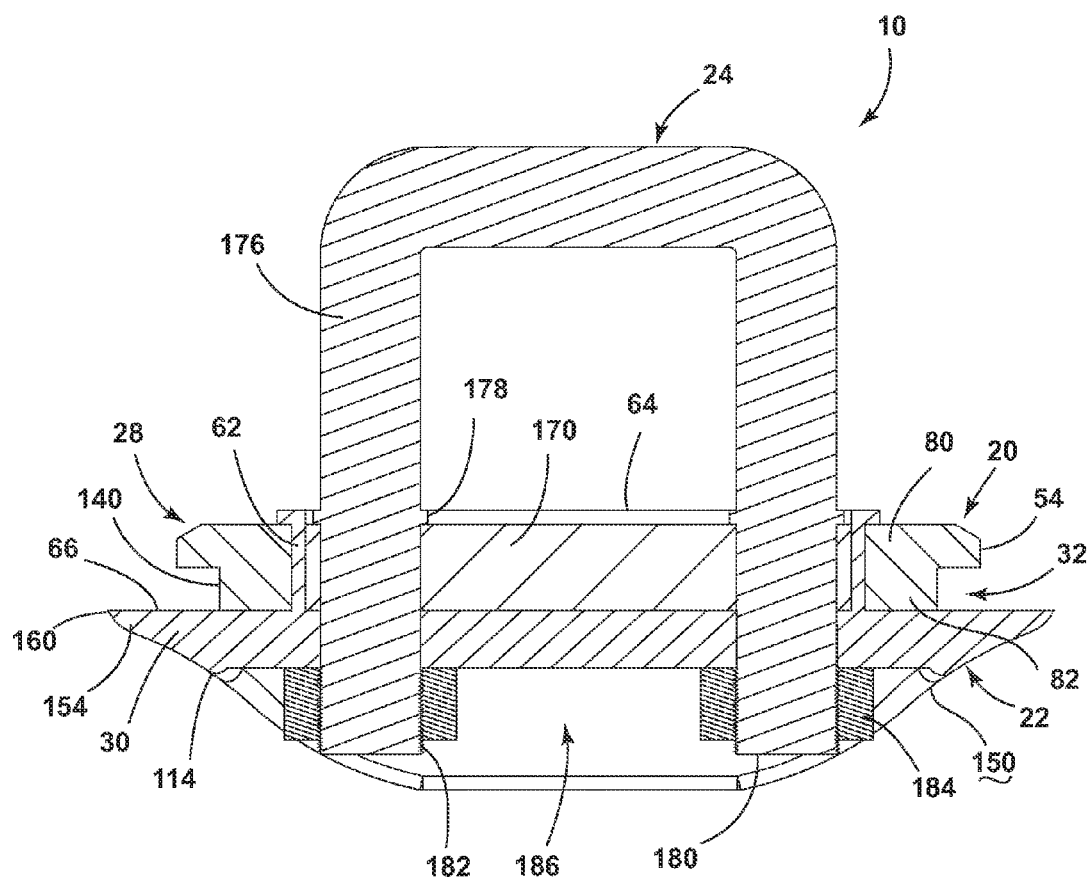
FIG. 11 is a cross-sectional view of the removable bull ring of FIG. 9 taken at line XI-XI.
Figure 12:
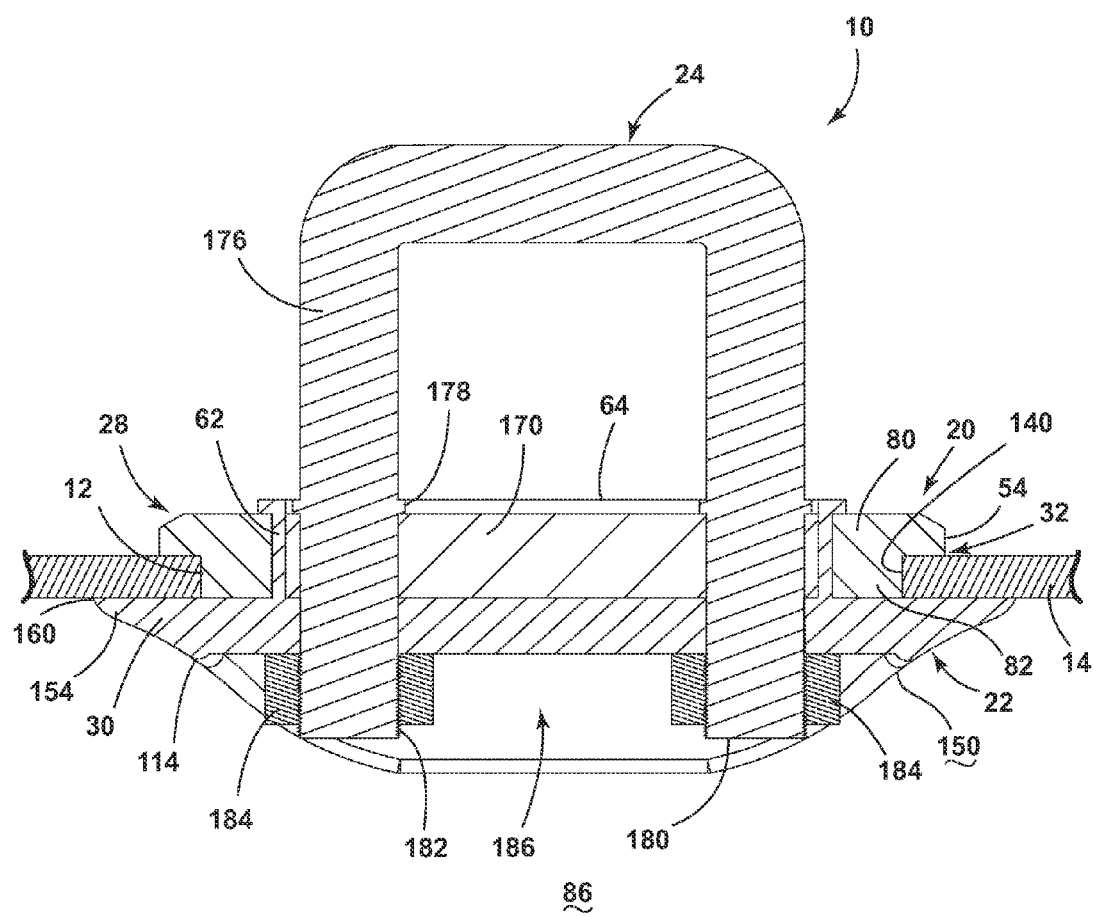
FIG. 12 is a cross-sectional view of the removable bull ring of FIG. 2 taken at line XII-XII.
Figure 13:
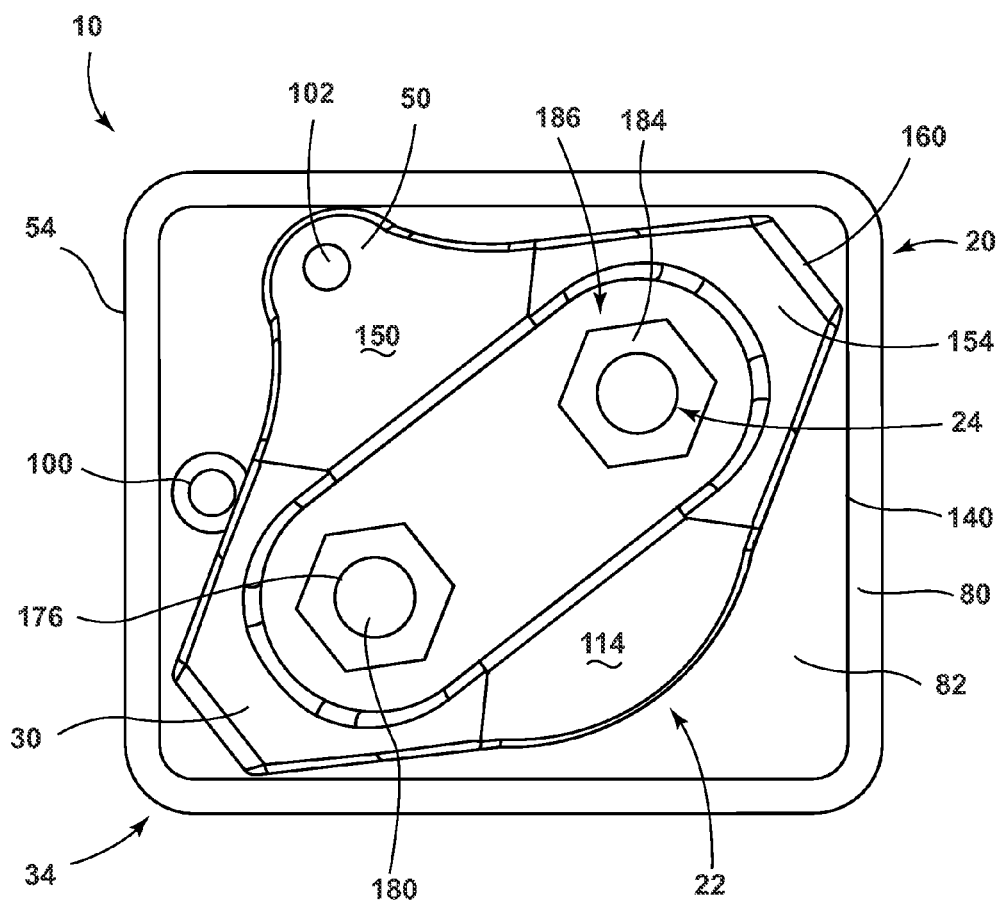
FIG. 13 is a bottom plan view of an embodiment of the removable bull ring in the installation position.
Figure 14:
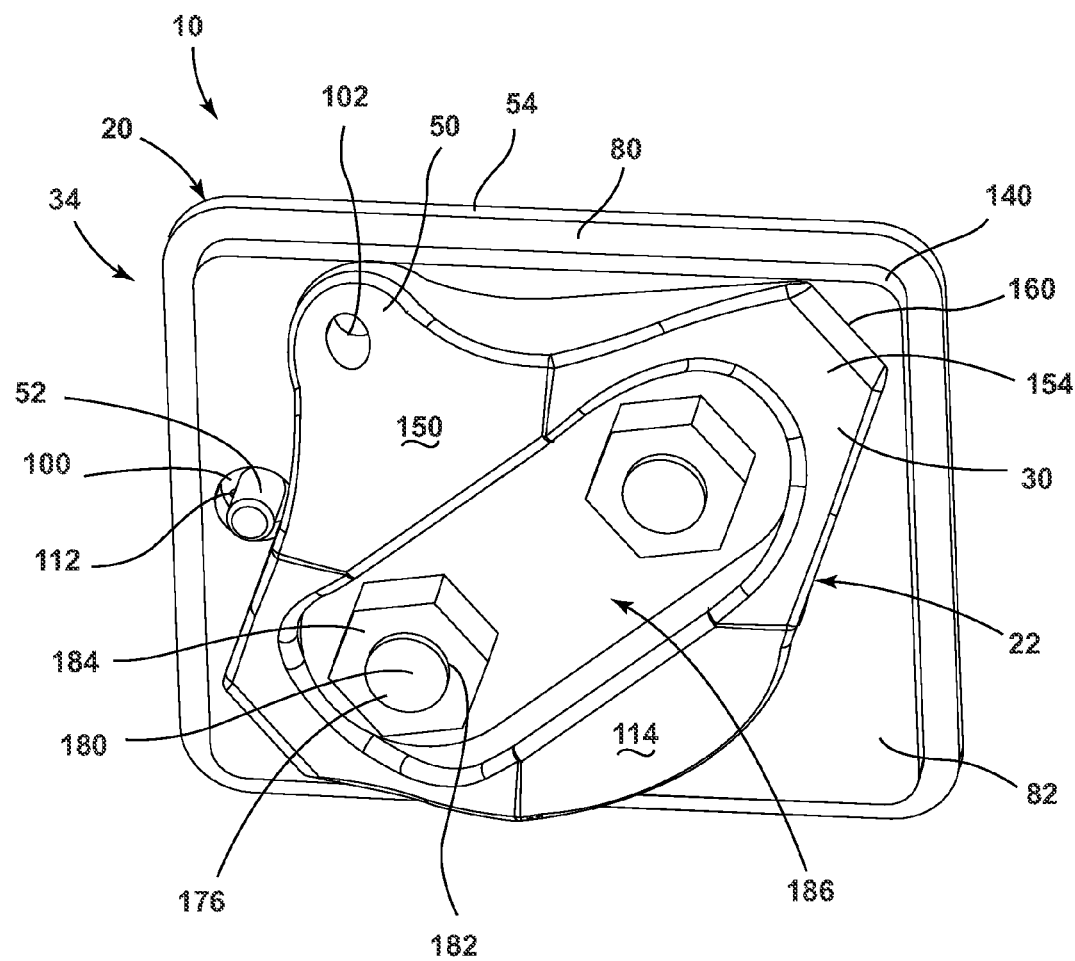
FIG. 14 is a bottom perspective view of the removable bull ring of FIG. 13.
Figure 15:
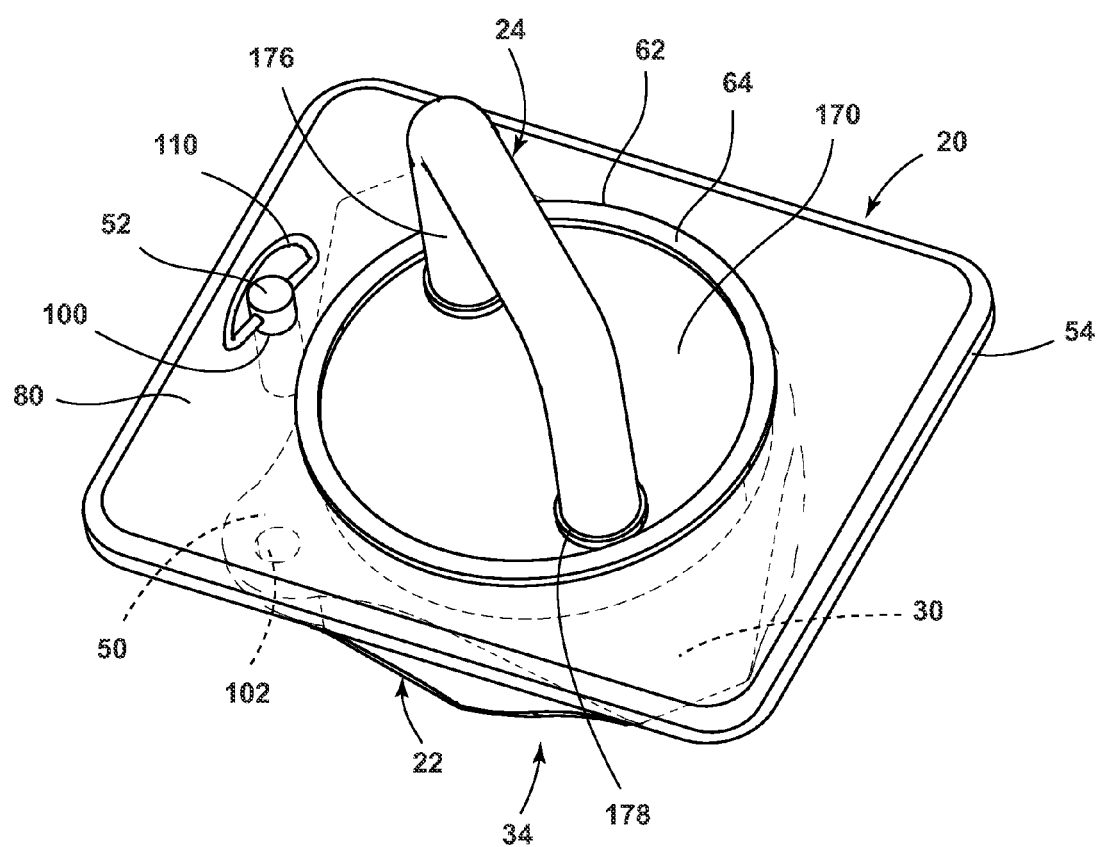
FIG. 15 is a top perspective view of the removable bull ring of FIG. 13.
Figure 16:
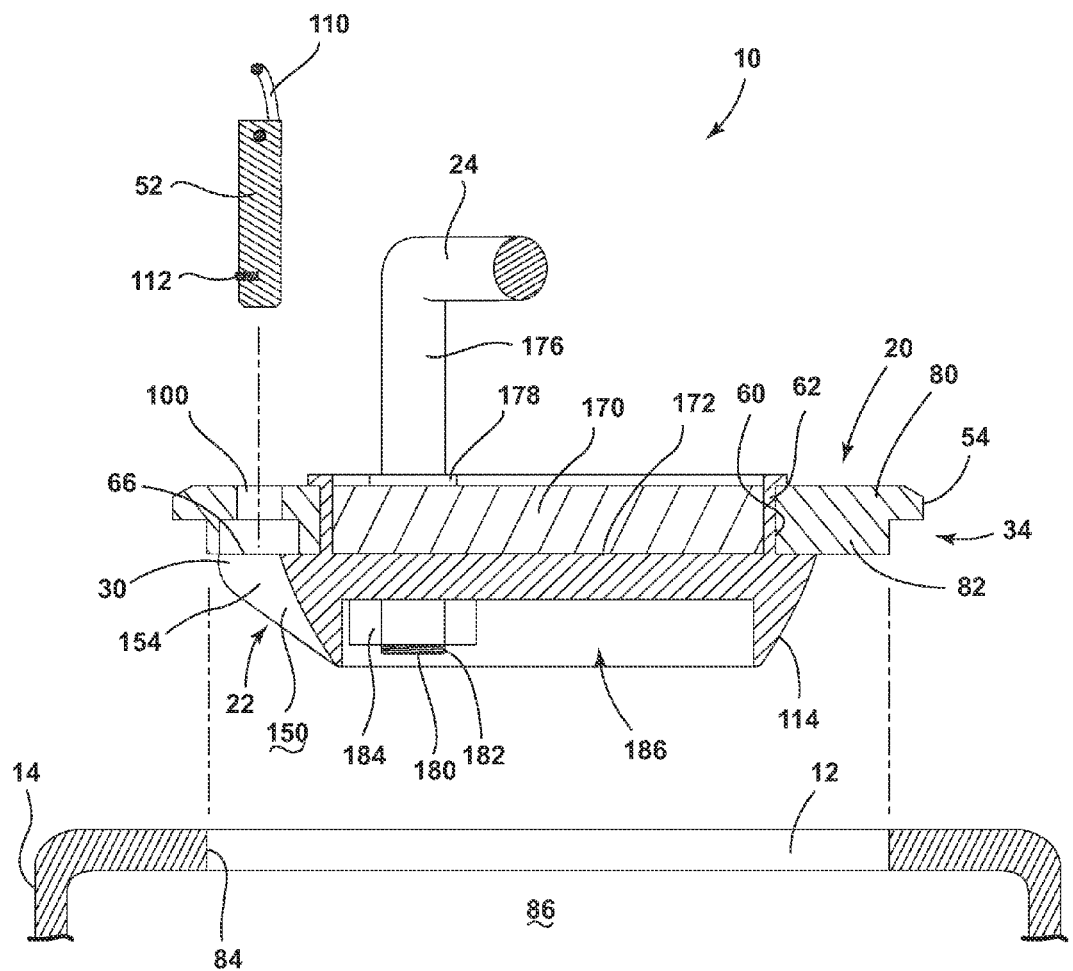
FIG. 16 is a cross-sectional view of the embodiment of FIG. 1, taken along line XVI-XVI, with the removable bull ring removed from the stake pocket and the bull ring in the installation position.
Figure 17:
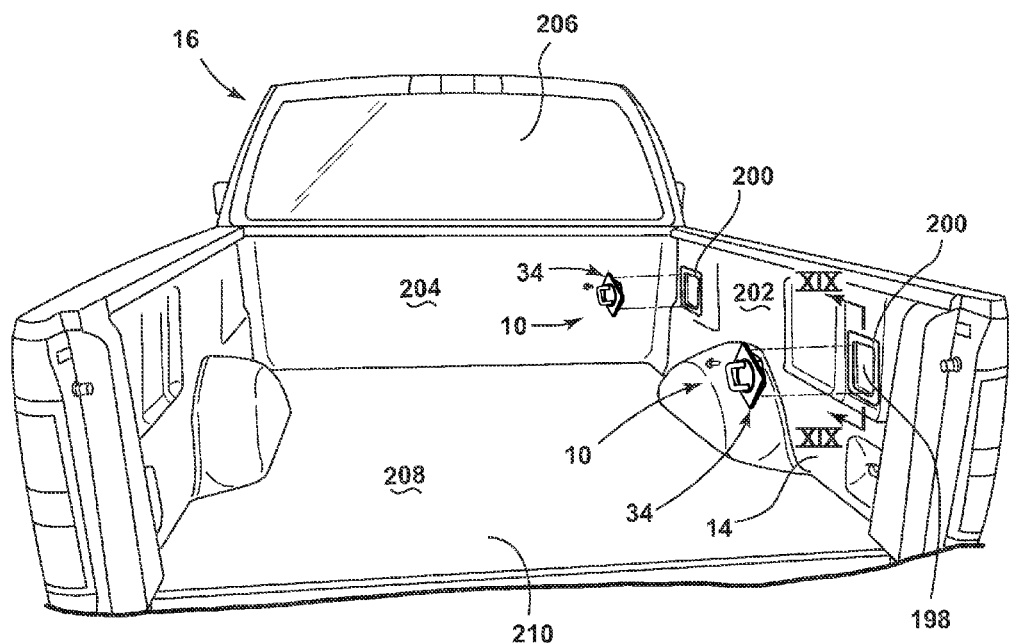
FIG. 17 is a partially exploded rear perspective view of a vehicle with an alternate embodiment of the removable bull ring in an installation position.
Figure 18:
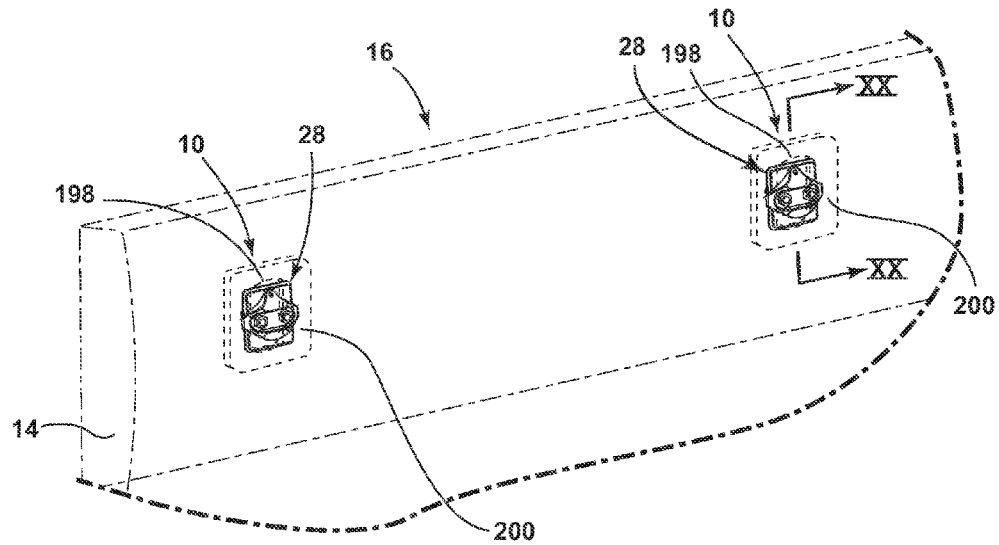
FIG. 18 is a rear perspective view of a vehicle with an embodiment of the removable bull ring in a securing position and installed in the standard interface plate of a bed side rail.
Figure 19:
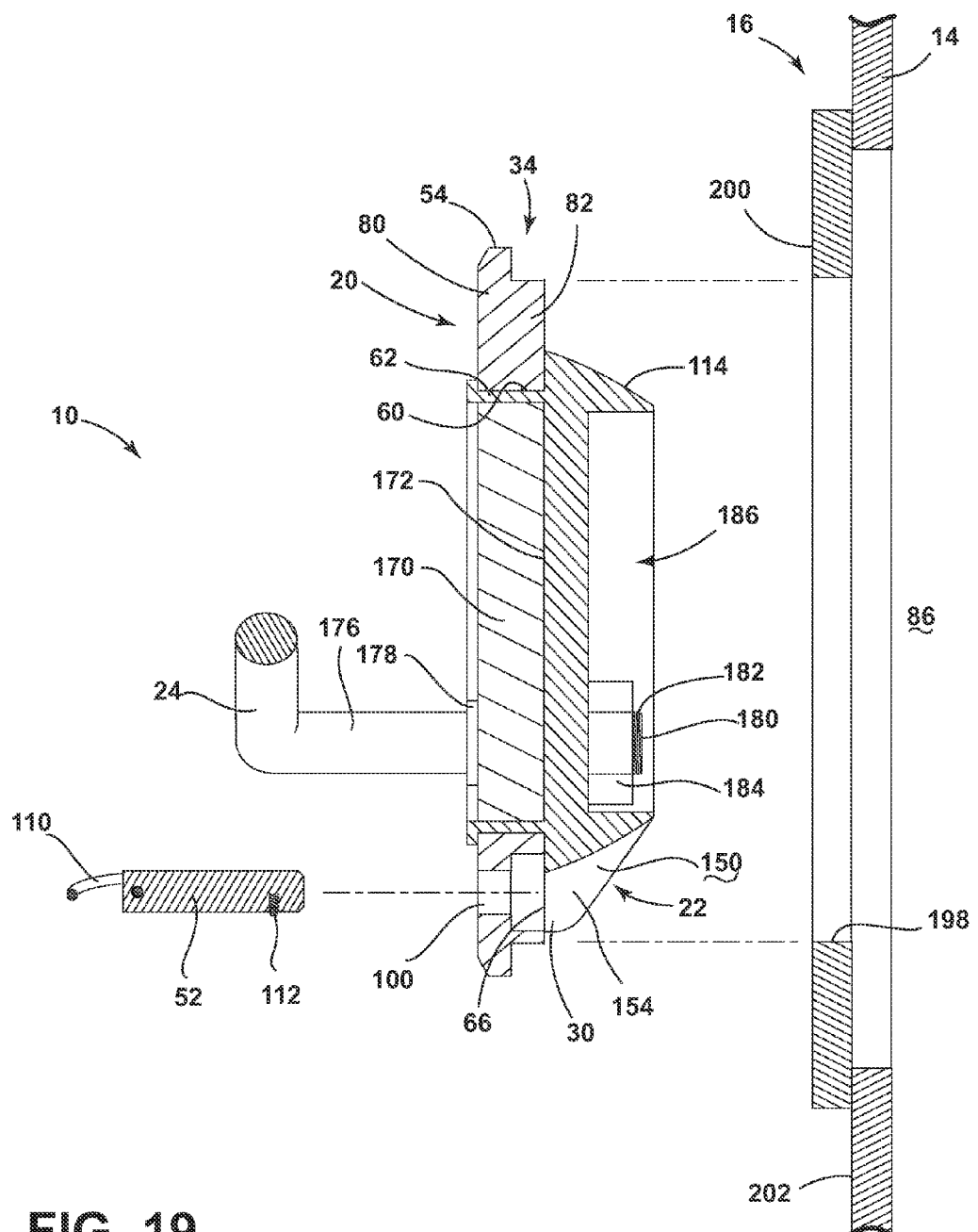
FIG. 19 is a cross-sectional view of the embodiment of FIG. 17, taken along line XIX-XIX, with the removable bull ring removed from the standard interface plate and the bull ring in the installation position.
Figure 20:
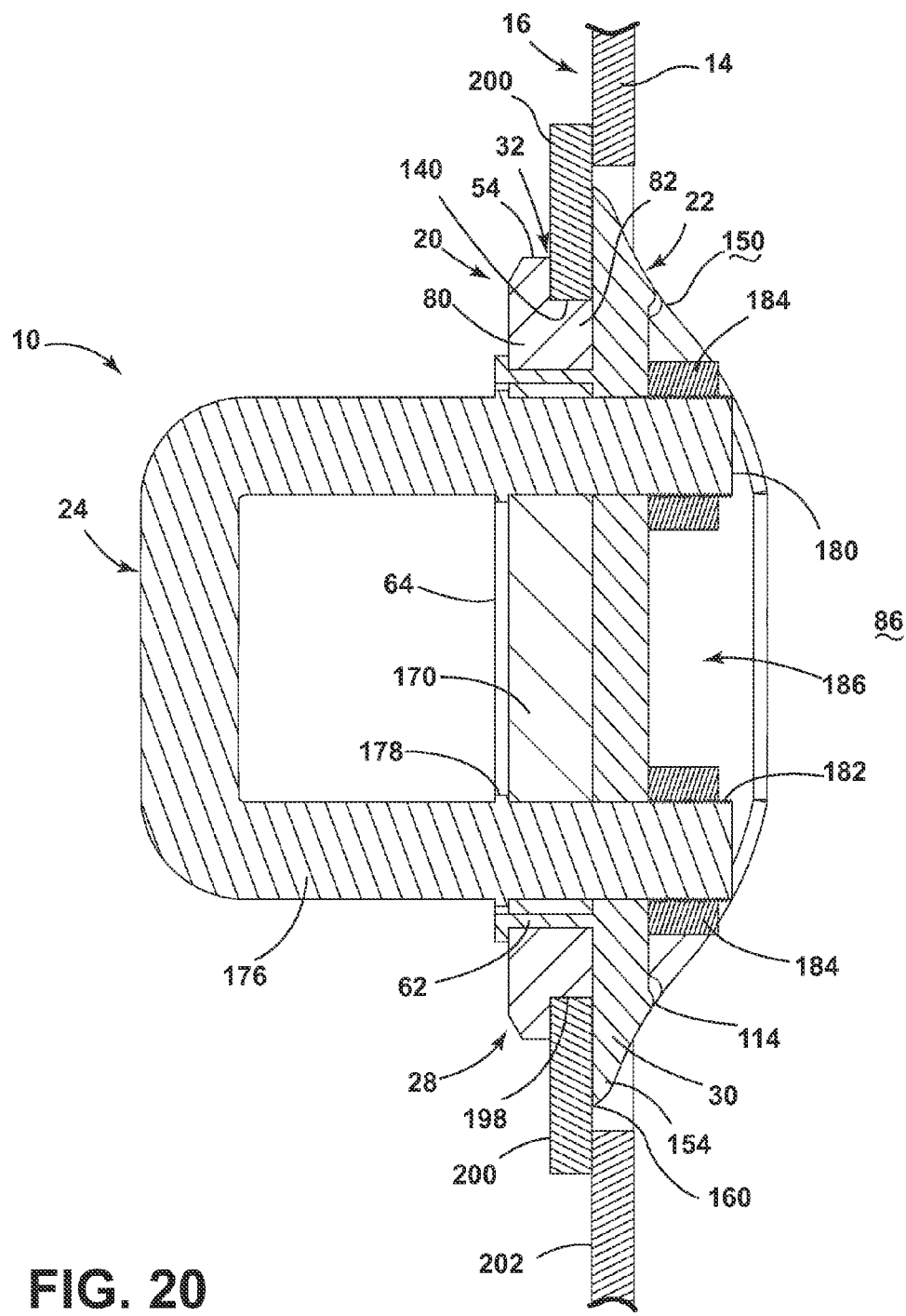
FIG. 20 is a cross-sectional view of the removable bull ring of FIG. 18 taken at line XX-XX.

As shown in FIGS. 1-4, reference numeral 10 generally refers to a removable bull ring 10 as shown removed from, or about to be installed on, the stake pocket 12 of a bed side rail 14 of a pick-up truck 16, according to one embodiment. A removable bull ring 10 includes a top plate 20 and a rotating plate 22 rotationally coupled with the top plate 20, where a U-shaped member or tie-down 24 is coupled to the rotating plate 22. A fastening mechanism is configured to secure the rotating plate 22 in a securing position 28 relative to the top plate 20. In the securing position 28 (shown in FIG. 2), two opposing rail flanges 30 of the rotating plate 22 extend beyond the top plate 20 to define a clamping region 32 (shown in FIG. 11) with the top plate 20. In an installation position 34 (shown in FIG. 13), the two opposing rail flanges 30 do not extend beyond the top plate 20 such that the rotating plate 22 can be inserted directly and perpendicularly into the stake pocket 12, as will be more fully described below.

Figure 1:
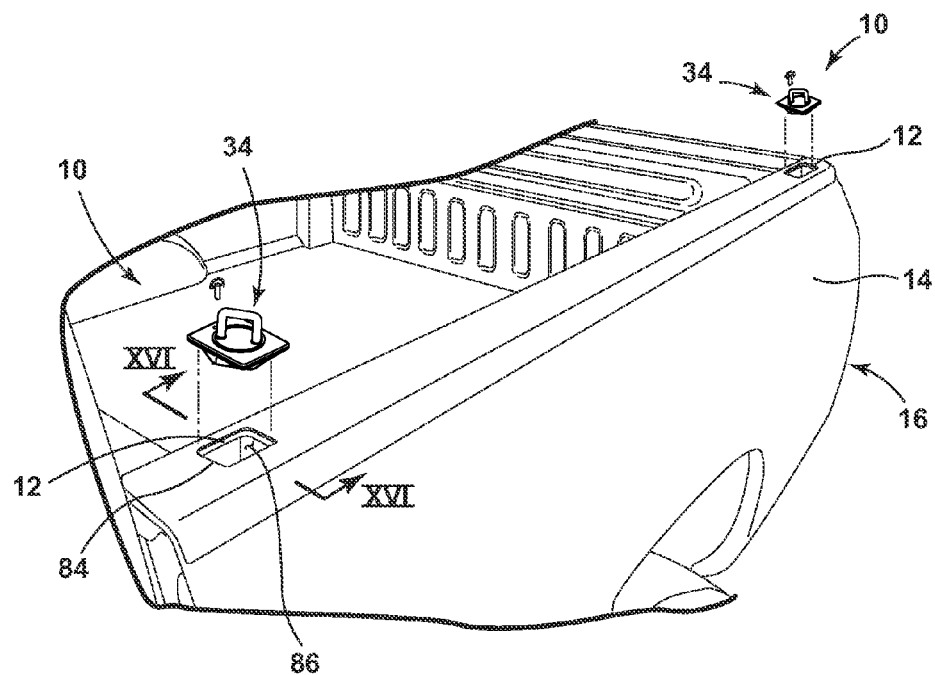
FIG. 1 is a partially exploded rear perspective view of a vehicle with an embodiment of the removable bull ring in an installation position.
Figure 2:
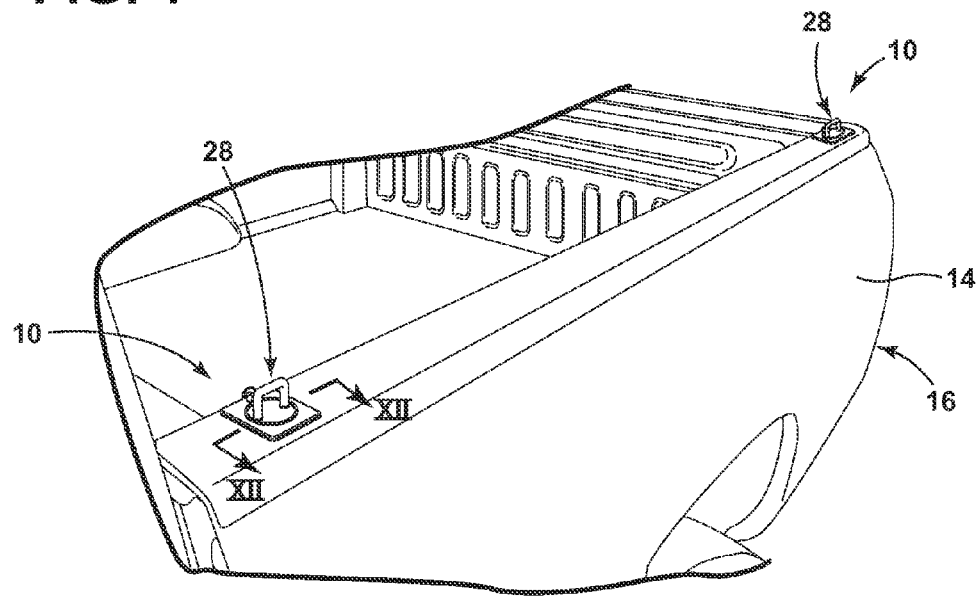
FIG. 2 is a rear perspective view of a vehicle with an embodiment of the removable bull ring in a securing position and installed in the stake pocket of a bed side rail.

As shown in FIG. 2, the removable bull ring 10 is installed in the stake pocket 12 of the bed side rail 14 of the vehicle 16, and the rotating plate 22 is placed in the securing position 28 such that a portion of the bed side rail 14 is disposed within the clamping region 32 defined between the opposing rail flanges 30 and the top plate 20, such that the removable bull ring 10 is selectively coupled with the bed side rail 14 of the vehicle 16, as will also be more fully described below. As will be described more fully, below, the removeable bull ring 10 can also be configured to engage a standard interface plate 200 (shown in FIGS. 17-20) of a vehicle 16.

Referring now to FIGS. 3-11, in various embodiments, the removable bull ring 10 includes a connecting flange 50 of the rotating plate 22 that is configured to receive a fastener 52. The connecting flange 50 is substantially perpendicular to the two opposing rail flanges 30. The connecting flange 50 does not extend beyond an outer edge 54 of the top plate 20, when the removable bull ring 10 is in either the securing position 28 or the installation position 34.

Figure 5:
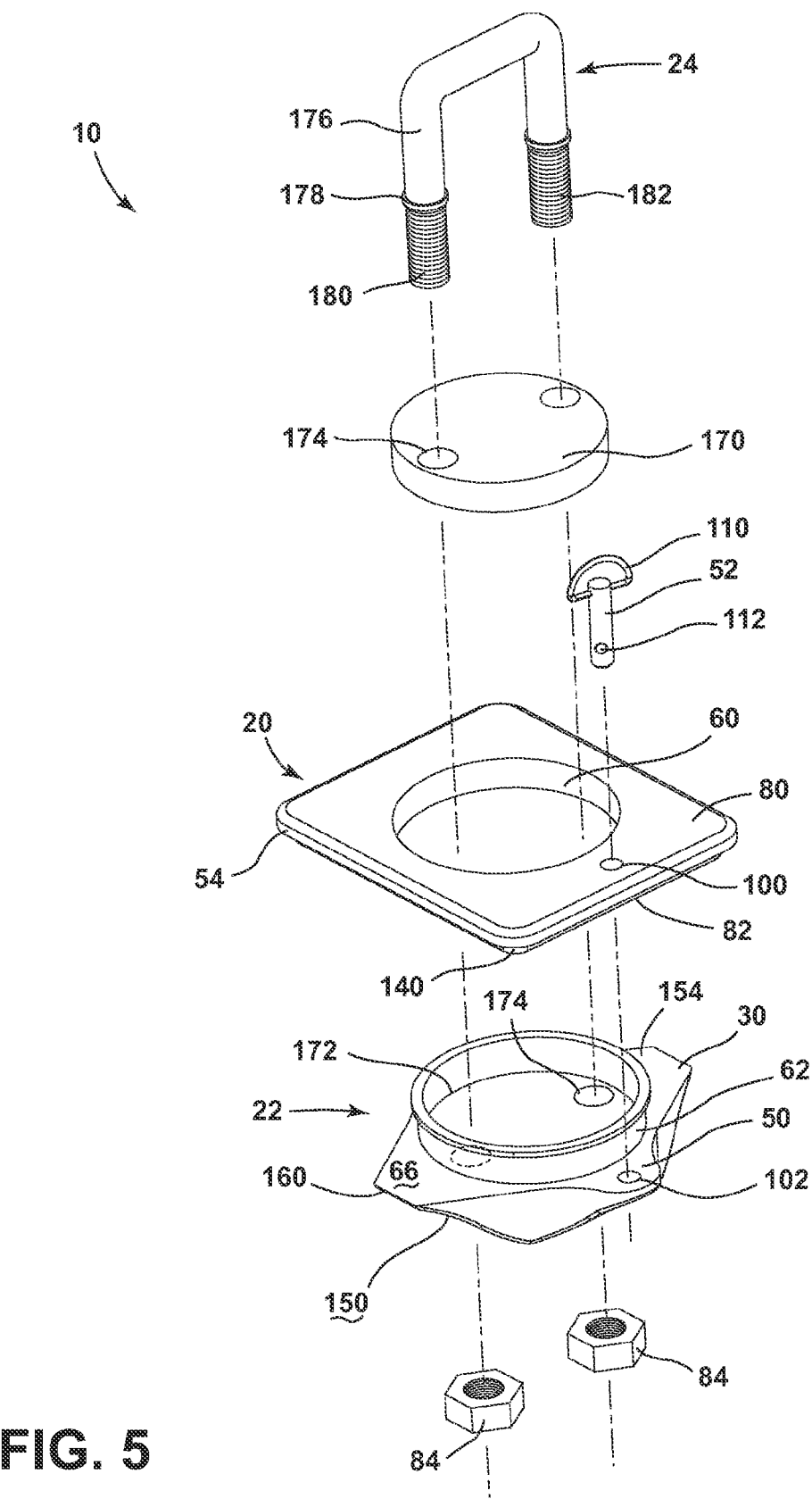
FIG. 5 is an exploded perspective view of the removable bull ring of FIG. 3.
Figure 6:
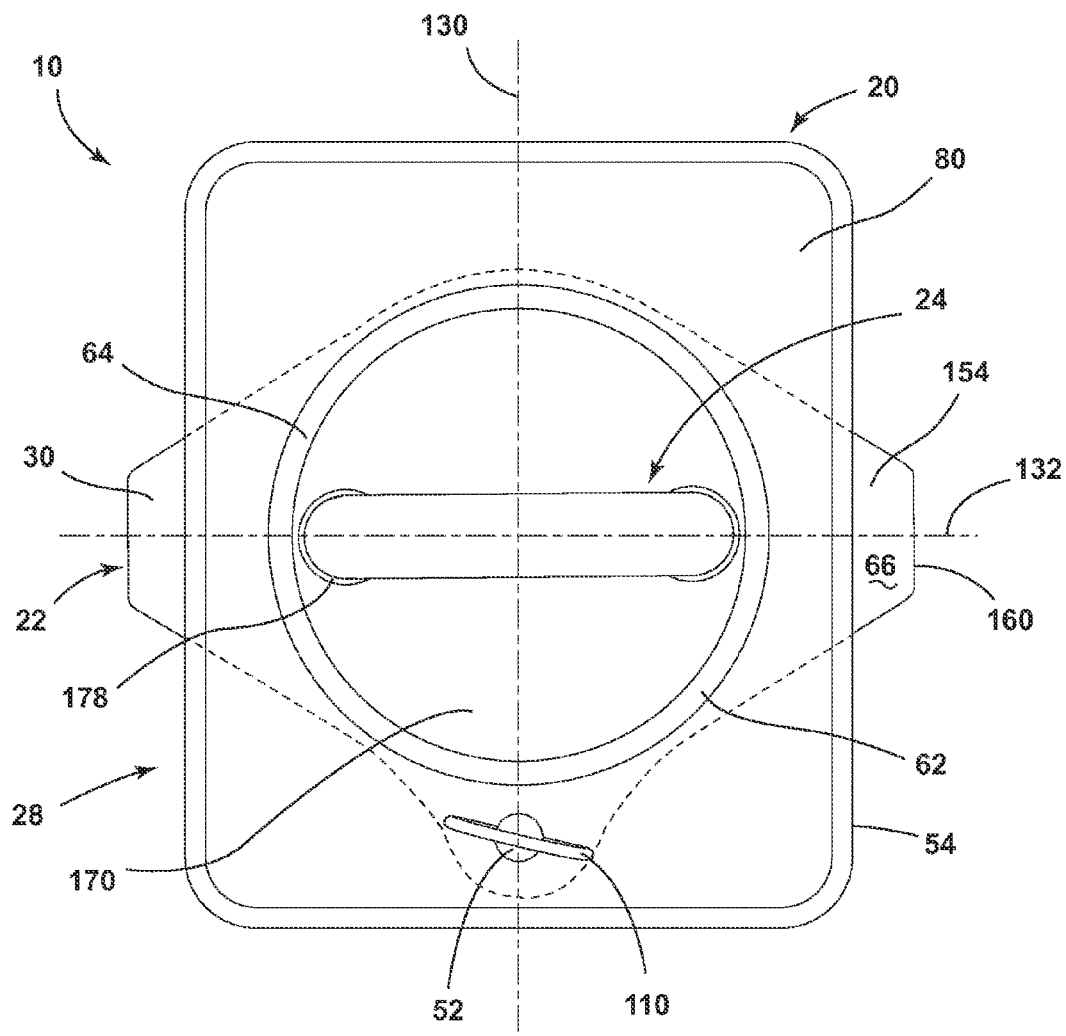
FIG. 6 is a top plan view of the removable bull ring of FIG. 3.

As shown in FIGS. 3, 5 and 6, the top plate 20 includes a circular aperture 60 defined therein, wherein the circular aperture 60 is configured to receive a circular protrusion 62 of the rotating plate 22. The circular protrusion 62 of the rotating plate 22 includes an upper rim 64 that extends outward from the circular protrusion 62. The portions of the top plate 20 proximate the circular aperture 60 are configured to engage the circular protrusion 62 such that the top plate 20 fits between the upper rim 64 and the upper surface 66 of the opposing rail flanges 30 and the connecting flange 50. In this manner, the rotating plate 22 can rotate within the top plate 20, a full 360°, clockwise or counterclockwise, to define the securing and installation positions 34 of the removable bull ring 10. In various embodiments, the circular protrusion 62 and rotating plate 22 can be formed as a single integral piece, or the circular protrusion 62 can be a separate member coupled with the remainder of the rotating plate 22.

In various embodiments, a rotational mechanism can be disposed between the circular aperture 60 and the circular protrusion 62 to allow the rotating plate 22 more freedom of rotation within the circular aperture 60 of the top. These rotational mechanisms can include, but are not limited to, ball bearings, lubricants, slidable interfaces, a combination thereof, or other rotational interfaces that permit greater freedom of movement between the top plate 20 and the rotating plate 22. In other alternate embodiments, the rotation of the rotating plate 22 within the top plate 20 can be limited such that the rotating plate 22 can only rotate between the securing position 28 and the installation position 34. Such an embodiment allows the user to more easily determine the positioning of the rotating plate 22 relative to the top plate 20. In still other alternate embodiments, indicia can be placed upon the top plate 20 and the circular protrusion 62 that communicate to the user the relative positions of the rotating plate 22 and the top plate 20 to ascertain when the removable bull ring 10 is in the securing position 28 or the installation position 34 or some other predetermined position. In this alternate embodiment, the indicia can take the form of markings that include, but are not limited to, surface applications of the top plate 20 and the circular protrusion 62, markings engraved within or defined by the surface of the top plate 20 and/or the circular protrusion 62, raised or textured surfaces of the top plate 20 and/or the circular protrusion 62, or combinations thereof.

As illustrated in FIGS. 4-16, the top plate 20 includes an upper cover portion 80 and a lower receptacle portion 82, wherein the cover portion 80 is larger than the receptacle portion 82. The receptacle portion 82 of the top plate 20 is configured to fit within the stake pocket 12 of the bed side rail 14 and is sized relative to the stake pocket 12 such that the top plate 20 of the removable bull ring 10 is afforded limited lateral movement when installed within the stake pocket 12. The receptacle portion 82 is also configured such that the thickness of the receptacle portion 82 is approximately the same thickness as the material of the bed side rail 14 proximate the stake pocket 12. The cover portion 80 of the top plate 20 is configured to be larger than the stake pocket 12, such that when the removable bull ring 10 is installed within the stake pocket 12, the cover portion 80 of the top plate 20 extends beyond each of the edges 84 that define the stake pocket 12, thereby concealing the stake pocket 12 and also allowing the receptacle portion 82 of the top plate 20 to be inserted into the stake pocket 12 without the entire top plate 20 passing through the stake pocket 12. In this manner, when the receptacle portion 82 of the top plate 20 is inserted into the stake pocket 12, the rotating plate 22 is inserted through the bed side rail 14 and disposed on an interior portion 86 of the bed side rail 14 such that the rotating plate 22 can rotate within the interior portion 86 of the bed side rail 14 to be disposed between the securing position 28 and the installation position 34. The stake pocket 12, being typically rectangular in shape, prevents lateral and rotational movement of the top plate 20, when the receptacle portion 82 of the top plate 20 is disposed within the stake pocket 12. In this manner, when the removable bull ring 10 is disposed within the stake pocket 12, the top plate 20 is kept in a relatively fixed position relative to the stake pocket 12, while the rotating plate 22 can be rotated between the securing and installation positions 34.

Referring again to FIGS. 3-10, top and bottom fastener openings 100, 102 are defined within the top plate 20 and the connecting flange 50 of the rotating plate 22, respectively. The top and bottom fastener openings 100, 102 cooperate to define a receptacle 104 for a fastener 52, wherein the receptacle 104 is configured to receive the fastener 52 when the removable bull ring 10 is disposed in the securing position 28. When the removable bull ring 10 is not in the securing position 28, the fastener 52 can be disposed through either the top or bottom fastener opening 100, 102, but not both. In this manner, the top and bottom fastener openings 100, 102 cooperate to indicate to the user when the removable bull ring 10 is placed within the securing position 28. In various embodiments, the fastener 52 can take the form of a pin-type fastener or other alternate fasteners that can include, but are not limited to, screw-type fasteners, clips, hasps, clasps, or other types of fasteners that can be selectively placed through the top plate 20 and the rotating plate 22.

In various alternate embodiments, the rotating plate 22 can include a bottom fastener opening 102 that is defined by one of or both of the opposing rail flanges 30, wherein the removable bull ring 10 can include one of two securing positions 28. In such an embodiment, the rotating plate 22 would not require a connecting flange 50. The location of the bottom fastener opening 102 in one or both of the opposing rail flanges 30, relative to the location of the top fastener opening 100 in the top plate 20, defines the securing position 28 of the removable bull ring 10. In other alternate embodiments, the top plate 20 can include a plurality of top fastener openings 100 that are configured to receive fasteners 52, that when installed, are positioned adjacent to one or more of the opposing rail flanges 30. In this manner, the various fasteners 52 being inserted in the plurality of top fastener openings 100 disposed within the top plate 20 serves to confine the opposing rail flanges 30 in the securing position 28 without the need for the fasteners 52 to extend through any portion of the rotating plate 22. In such an embodiment, the fasteners 52 can be a plurality of pins, or one or more individual pins that can be placed through two or more top fastener openings 100 in the top plate 20 simultaneously to confine the rotating plate 22 within the securing position 28.

As shown in FIGS. 3-10, the fastener 52 can include a ring 110 to allow the user to grasp and conveniently pull the fastener 52 from the receptacle 104 defined by the top and bottom fastener openings 100, 102. The ring 110 also provides a mechanism that prevents the fastener 52 from passing entirely through the top and bottom fastener openings 100, 102, wherein the ring 110 engages the top surface of the top plate 20 and prevents the fastener 52 from proceeding through the top plate 20 further. In alternate embodiments, the fastener 52 can include alternate grasping mechanisms that include, but are not limited to, handles, textured portions, portions with alternate materials that provide greater friction and grip, or other such grasping mechanisms. In various alternate embodiments, the fastener 52 can include an end portion that is wider than the remainder of the fastener 52, such as a cap, a flared portion, or an edge that has a greater circumference than the top fastener opening 100, such that the fastener 52 will not pass entirely through the top fastener opening 100 of the top plate 20 and prevent the fastener 52 from passing clear through the removable bull ring 10.

In various alternate embodiments, the fastener 52 can include a biasing mechanism 112, at an end of the fastener 52 that selectively engages a bottom surface 114 of the rotating plate 22 proximate to the bottom fastener opening 102. The biasing mechanism 112 can be a ball detent, or other similar biasing member that can selectively secure the fastener 52 within the receptacle 104. Such a biasing mechanism 112 substantially and selectively prevents the fastener 52 from escaping the receptacle 104 during use of the vehicle 16, such as when the vehicle 16 encounters bumpy or otherwise rough surface conditions.

Referring again to FIGS. 4-16, the rotating plate 22 includes the two opposing rail flanges 30, and the connecting flange 50 that is configured substantially perpendicular to the opposing rail flanges 30. The rotating plate 22, as discussed above, is rotatable within and relative to the top plate 20 between the securing position 28 and an installation position 34. The securing position 28 is defined by the two opposing rail flanges 30 extending beyond at least the receptacle portion 82 of the top plate 20. In alternate embodiments, when the rotating plate 22 is positioned in the securing position 28, the two opposing rail flanges 30 extend at least to the outer edge 54 of the cover portion 80. In other alternate embodiments, the opposing rail flanges 30 extend beyond the cover portion 80 of the top plate 20 when disposed in the securing position 28. The connecting flange 50 is configured such that the receptacle portion 82 of the top flange extends even with or extends beyond the outer extent of the connecting flange 50, such that the top fastener opening 100 of the top plate 20 can align with the bottom fastener opening 102 of the rotating plate 22 when the rotating plate 22 is in the securing position 28.

Figure 7:
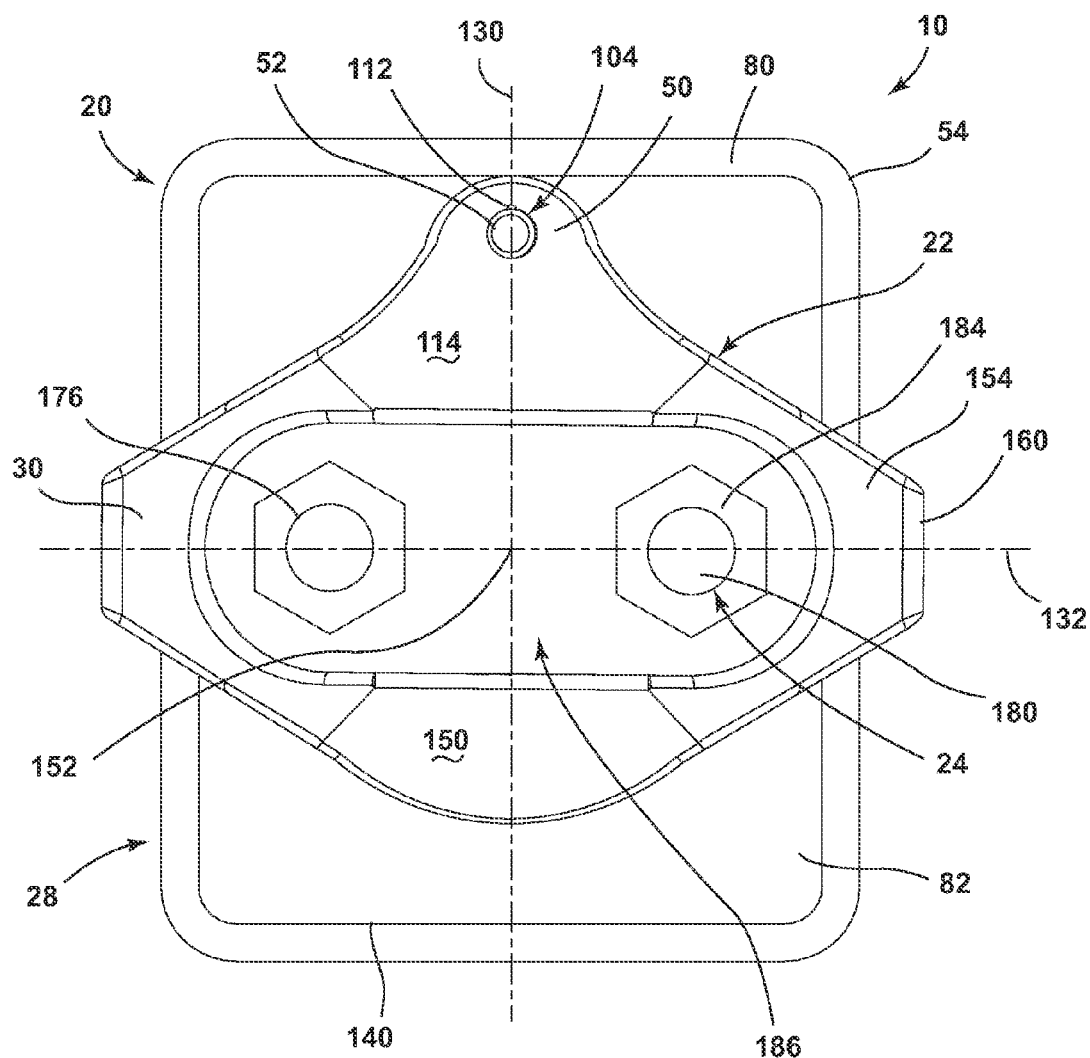
FIG. 7 is a bottom plan view of the removable bull ring of FIG. 3.
Figure 8:
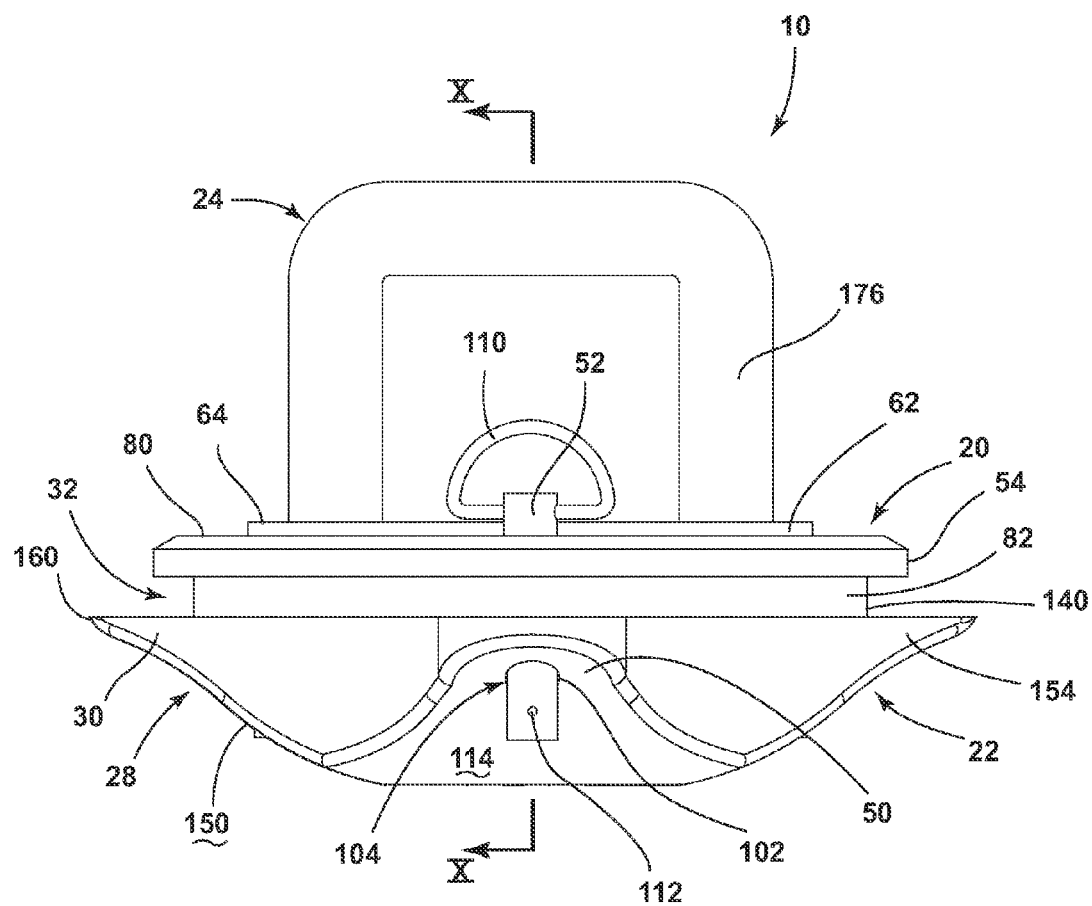
FIG. 8 is a first side elevation view of the removable bull ring of FIG. 3.
Figure 9:
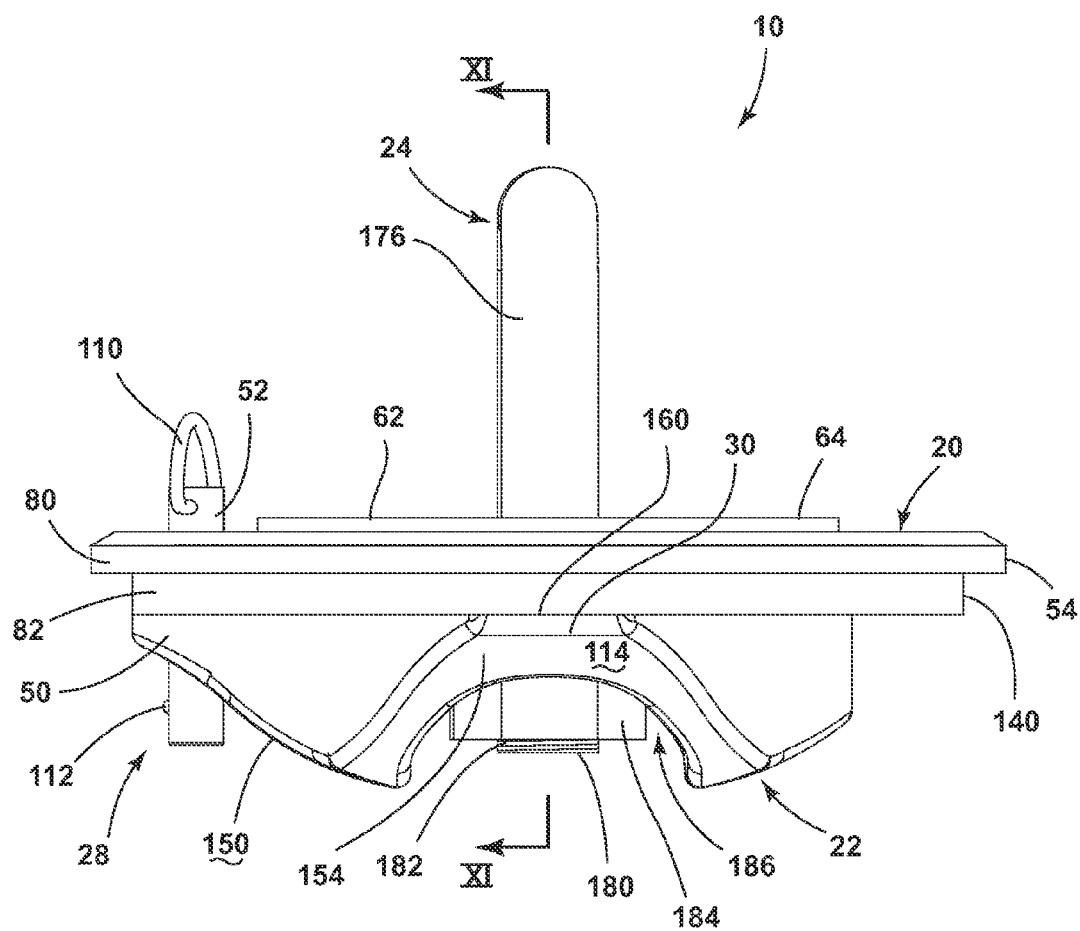
FIG. 9 is a second side elevation view of the removable bull ring of FIG. 3.
Figure 10:
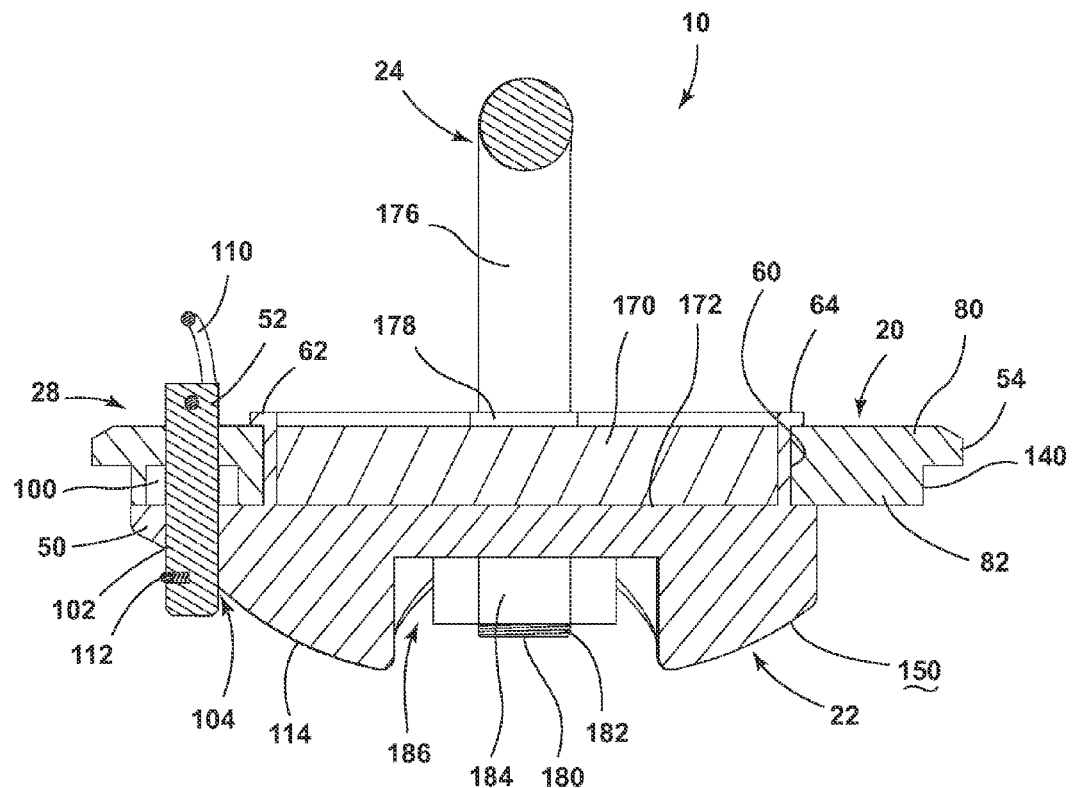
FIG. 10 is a cross-sectional view of the removable bull ring of FIG. 8 taken at line X-X.

As illustrated in FIGS. 6-7, the top plate 20 includes the rectangular configuration that has a primary axis 130 and a secondary axis 132, wherein the primary axis 130 is longer than the secondary axis 132. This configuration, as discussed above, matches the configuration of the stake pocket 12 that is generally proportional in shape to the shape of the top plate 20. When the removable bull ring 10 is disposed in the securing position 28, the two opposing rail flanges 30 extend parallel to the secondary axis 132 of the top plate 20 such that the two opposing rail flanges 30 extend beyond an outer edge 54 of the top plate 20. In this manner, portions of the bed side rail 14 can be disposed in the clamping region 32 between the two opposing rail flanges 30 and the cover portion 80 of the top plate 20 to secure the removable bull ring 10 within the stake pocket 12 of the bed side rail 14. When the rotating plate 22 is in the securing position 28, the connecting flange 50, being generally perpendicular to the two opposing rail flanges 30, is substantially parallel with the primary axis 130 of the top plate 20. In this manner, the top fastener opening 100 of the top plate 20 is also disposed along the primary axis 130 of the top plate 20, such that the fastener 52 can be disposed through the top plate 20 and the connecting flange 50 to substantially secure the rotating plate 22 in the securing position 28 relative to the top plate 20. In alternate embodiments, as discussed above, where the rotating plate 22 lacks a connecting flange 50 and the fastener 52 is positioned through the top plate 20 and at least one of the two opposing rail flanges 30, the top fastener opening 100 is disposed substantially along the secondary axis 132 of the top plate 20, such that the two opposing rail flanges 30 can be disposed parallel with the secondary axis 132 of the top plate 20, in the securing position 28.

In other various alternate embodiments, the rotating plate 22 can include a pair of opposing connecting flanges that are each disposed perpendicular to the two opposing rail flanges 30 such that the rotating plate 22 includes two securing positions 28 that can be achieved when either of the opposing connecting flanges are positioned proximate the top fastener opening 100. In this embodiment, the bottom fastener opening 102 of either of the two opposing connecting flanges can receive the fastener 52 to secure the rotating plate 22 in the securing position 28. To achieve a greater level of stability, the top plate 20 can include a pair of top fastener openings 100 that, with the bottom fastener openings 102 of the two opposing connecting flanges, defines two receptacles 104, wherein these two receptacles 104 can receive two separate fasteners 52.

As illustrated in FIGS. 1 and 13-16, the rotating plate 22 can also be disposed in the installation position 34, which, as discussed above, is defined by the two opposing rail flanges 30 and the connecting flanges 50 being positioned within a boundary 140 defined by the receptacle portion 82 of the top plate 20. In this manner, when the rotating plate 22 is disposed in the installation position 34, the rotating plate 22 and the receptacle portion 82 of the top plate 20 can be disposed through the stake pocket 12 of the bed side rail 14 perpendicularly with the stake pocket 12. In other words, the rotating plate 22 and the receptacle portion 82 of the top plate 20 can be inserted into the stake pocket 12, without the user having to tilt, lean or otherwise reposition the angle of the removable bull ring 10 relative to the stake pocket 12 to install the removable bull ring 10 within the stake pocket 12.

Referring now to FIGS. 8-12, the bottom surface 114 of the rotating plate 22 is also tapered in an upward direction toward the top plate 20, such that the bottom surface 114 of the rotating plate 22 includes a plurality of sloped surfaces 150 that slope upwards from the center 152 of the rotating plate 22 to the ends 154 of the two opposing rail flanges 30 and the end 154 of the connecting flange 50. In this manner, as the removable bull ring 10 is inserted within the stake pocket 12, the plurality of sloped surfaces 150 engage the edges 84 of the stake pocket 12 and bias the rotating plate 22 towards the center of stake pocket 12, such that the rotating plate 22 is guided into the stake pocket 12 for more convenient insertion into the stake pocket 12.

Referring again to FIGS. 7 and 13, the rotating plate 22 is generally oblong in shape, such that the rotating plate 22 at the two opposing rail flanges 30 is longer than the rotating plate 22 perpendicular to the opposing rail flanges 30. In addition, the two opposing rail flanges 30 have a generally tapered configuration, wherein each of the opposing rail flanges 30 tapers toward a narrow end 154 and terminates at a distal edge 160 of each of the opposing rail flanges 30. This tapered configuration allows the rotating plate 22 to be disposed within the installation position 34 such that the two opposing rail flanges 30 can be positioned within the boundary 140 of the receptacle portion 82 of the top plate 20. This tapered configuration allows the opposing rail flanges 30 to extend a length that is longer than the receptacle portion 82 of the top plate 20 along the primary axis 130 of the top plate 20. In this manner, the opposing rail flanges 30 can extend further beyond the edges 84 of the stake pocket 12 to better secure the removable bull ring 10 to the bed side rail 14 proximate the stake pocket 12. Similarly, the connecting flange 50 of the rotating plate 22 is configured such that it extends to the boundary 140 of the receptacle portion 82 of the top plate 20 along the primary axis 130 of the top plate 20 when in the securing position 28. Alternatively, when the rotating plate 22 is disposed in the installation position 34, the connecting flange 50 remains within the boundary 140 of the receptacle portion 82 of the top plate 20, such that the rotating plate 22 and the receptacle portion 82 of the top plate 20 can be inserted into the stake pocket 12 of the bed side rail 14. The configuration of the opposing rail flanges 30 is such that the distal edges 160 of the opposing rail flanges 30 are a predetermined length such that the opposing rail flanges 30 will provide sufficient extension outside of the boundary 140 of the receptacle portion 82 of the top plate 20 to adequately secure the removable bull ring 10, while also fitting within the boundary 140 of the receptacle portion 82 when in the installation position 34. Similarly, the connecting flange 50 is sized such that it will fit within the boundary 140 of the receptacle portion 82 in the installation position 34, but also extend far enough such that the top and bottom fastener openings 100, 102 can adequately secure the rotating plate 22 in the securing position 28.

It should be understood that alternate configurations of the rotating plate 22 can be used so long as the alternate configuration includes an installation position 34 wherein the outlying flanges of the rotating plate 22 are disposed within the boundary 140 of the receptacle portion 82 of the top plate 20.

Referring again to FIGS. 3-13, a U-shaped tie-down 24 is disposed through the rotating plate 22 at the circular protrusion 62. In this manner, the U-shaped tie-down 24 is configured to rotate with the circular protrusion 62 as the rotating plate 22 is rotated between the securing position 28 and the installation position 34. In various embodiments, a supporting disk 170 can be inserted into an inner portion 172 of the circular protrusion 62 to provide additional structural support to the U-shaped tie-down 24. The supporting disk 170 and the rotating plate 22 can include tie-down apertures 174 through which legs 176 of the U-shaped tie-down 24 can be inserted to connect the U-shaped tie-down 24 to the rotating plate 22. Positioning flanges 178 are disposed on each of the legs 176 of the U-shaped tie-down 24 to vertically position the U-shaped tie-down 24 relative to the rotating plate 22. The ends 180 of each of the legs 176 of the U-shaped tie-down 24 each include threaded portions 182 for receiving threaded fasteners 184 that are configured to secure the U-shaped tie-down 24 to the rotating plate 22. In various embodiments, the rotating plate 22 can include a tie-down receptacle 186 defined within the bottom surface 114 of the rotating plate 22 within which the threaded fasteners 184 can engage the ends 180 of each of the legs 176 of the U-shaped tie-down 24. As the threaded fasteners 184 are tightened around the ends 180 of the legs 176 of the U-shaped tie-down 24, the supporting disk 170 is disposed to the rotating plate 22 between the threaded fasteners 184 and the positioning flanges 178 of the U-shaped tie-down 24. In this manner, the U-shaped tie-down 24 is secured to the rotating plate 22 such that the U-shaped tie-down 24 can receive loads placed upon it during use of the vehicle 16 to which the removable bull ring 10 is fastened.

In various alternate embodiments, alternate fastening mechanisms can be used to secure the U-shaped tie-down 24 to the rotating plate 22. These alternate fastening mechanisms can include, but are not limited to, pins, clasps, hasps, notched interfaces or other similar fastening mechanisms.

As shown in FIGS. 2-12, when the removable bull ring 10 is disposed in the securing position 28, the U-shaped tie-down 24 is aligned with the secondary axis 132 of the top plate 20. In alternate embodiments, the U-shaped tie-down 24 can be oriented along the primary axis 130 at the top plate 20. In such an embodiment, the tie-down receptacle 186 is aligned perpendicular to the opposing rail flanges 30. In still other alternate embodiments, the U-shaped tie-down 24 can be selectively repositioned between positions that are parallel and perpendicular to the opposing rail flanges 30. In such an embodiment, the rotating plate 22 includes a plurality of tie-down apertures 174 configured to receive the U-shaped tie-down 24 in a plurality of orientations. In still other alternate embodiments, the U-shaped tie-down 24 can be oriented in alternate configurations by the opposing flanges being disposed in an alternate securing position. In the alternate securing position, the opposing rail flanges 30 are disposed parallel with the primary axis 130 of the top plate 20 and extend beyond the receptacle portion 82 of the top plate 20 to define an alternate clamping region. In this embodiment, the top plate 20 includes an alternate top fastener opening such that the rotating plate 22 can be disposed in either the securing position 28 or the alternate securing position.

In various embodiments, alternate shaped tie-downs can be used. The shapes of these tie-downs can include, but are not limited to, mooring-type tie-downs, L-shaped tie-downs and other shaped tie-downs that can be used to secure cargo within the bed of a vehicle 16. In other alternate embodiments, the supporting plate and the rotating plate 22 can include a tie-down receptacle 186 for receiving a tie-down having a single leg, such as an I-hook or a mooring-type tie-down having a single leg. In these embodiments, the supporting disk 170 or the rotating plate 22 can include notches, protuberances or other members that can cooperate with a corresponding notch or protuberance of the single leg tie-down to prevent the single leg tie-down from spinning within the rotating plate 22 during use.

According to various embodiments, the removable bull ring 10 is made from substantially rigid and durable materials that include, but are not limited to, metals, metal alloys, and other substantially rigid materials. In other alternate embodiments, portions of the removable bull ring 10 can be coated in various materials that include, but are not limited to, plastics, plastic coatings, chrome, metallic-type coatings, and other similar materials that can limit corrosion to portions of the removable bull ring 10 and/or provide aesthetic qualities to the removable bull ring 10.

As illustrated in FIGS. 17-20, the removable bull ring 10 can be installed within a plate opening 198 of a standard interface plate 200 disposed on an inward-facing surface 202 of the bed side rail 14, a back surface 204 of the cab 206, a top surface 208 of the bed 210, or other portion of the vehicle 16 that can be used to support the removable tie-down to secure loads placed within the cargo areas of a vehicle 16. In such embodiments, when the removable bull ring 10 is disposed within the pocket opening 198 of the standard interface plate 200 in the securing position 28, a portion of the standard interface plate 200 proximate the pocket opening 198 is disposed within the clamping region 32 of the removable bull ring 10, thereby securing the removable bull ring 10 within the standard interface plate 200.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A bull ring for a vehicle comprising:
   a rotating plate rotationally coupled with a top plate, and having a U-shaped tie-down; and
   a fastener configured to engage a receptacle through the top plate and an outward connecting flange extending from the rotating plate to secure the rotating and top plates in a securing position, wherein opposing rail flanges of the rotating plate extend to define a clamping region with a top plate outer edge.

2. The bull ring of claim 1, wherein the connecting flange of the rotating plate is configured to receive the fastener, wherein the connecting flange is substantially perpendicular to the rail flanges, and wherein the connecting flange does not extend beyond the top plate outer edge.

3. The bull ring of claim 1, wherein the top plate includes a primary axis and a secondary axis, wherein the rail flanges extend beyond an outer edge of the top plate when the rail flanges are positioned substantially parallel with the secondary axis, thereby defining the securing position.

4. The bull ring of claim 2, wherein the top plate extends beyond the rail flanges and the connecting flange when the rotating plate is in an installation position.

5. The bull ring of claim 1, further comprising:
   a circular protrusion of the rotating plate secured within a circular aperture of the top plate, wherein the circular protrusion is configured to rotate within the circular aperture such that the rotating plate selectively rotates relative to the top plate.

6. The bull ring of claim 5, wherein the rotating plate includes a support plate disposed within the circular protrusion, and wherein the support plate and the rotating plate are separate members coupled together by the tie-down, and wherein the tie-down is a U-shaped member extending through the support plate and the rotating plate.

7. The bull ring of claim 2, wherein the top plate and the connecting flange each define openings that cooperatively define a receptacle configured to receive the fastener when the rail flanges are in the securing position, and wherein the fastener is a pin.

8. A bull ring for a vehicle comprising:
   a top plate coupled to a rotating plate having a tie-down;
   two opposing rail flanges and a perpendicular connecting flange separately extending from the rotating plate; and
   a fastener selectively coupling the rotating plate at the connecting flange in a securing position relative to the top plate, wherein the opposing rail flanges proximate an outer edge of the top plate define a clamping region with the top plate.

9. The bull ring of claim 8, wherein the connecting flange is substantially perpendicular to the rail flanges, and wherein the connecting flange does not extend beyond the outer edge of the top plate.

10. The bull ring of claim 8, wherein the top plate includes a primary axis, wherein the rail flanges extend beyond the outer edge when the rail flanges are positioned substantially perpendicular to the primary axis, thereby defining the securing position.

11. The bull ring of claim 9, wherein the top plate extends beyond the rail flanges and the connecting flange when the rotating plate is in an installation position.

12. The bull ring of claim 8, wherein the top plate defines a circular aperture within which a circular protrusion of the rotating plate is secured, wherein the circular protrusion is configured to rotate within the circular aperture such that the rotating plate selectively rotates relative to the top plate.

13. The bull ring of claim 12, wherein the rotating plate includes a support plate disposed within the circular protrusion, and wherein the support plate and the rotating plate are separate members coupled together by the tie-down, and wherein the tie-down is a U-shaped member extending through the support plate and the rotating plate.

14. The bull ring of claim 8, wherein the top plate and the connecting flange each define openings that cooperatively define a receptacle configured to receive the fastener when the rail flanges are in the securing position.

15. A bull ring for a vehicle comprising:
   a top plate coupled to a rotating plate having a tie-down;
   two opposing rail flanges extending from the rotating plate;
   a fastener selectively coupling the rotating plate in a securing position relative to the top plate, wherein the rail flanges extend at least proximate to an outer edge of the top plate to define a clamping region with the top plate; and
   a vehicle having a cargo bed side rail defining a pocket opening, wherein the two rail flanges and the rotating plate are configured to pass through the pocket opening when the two rail flanges are substantially aligned with a primary axis of the pocket opening, and wherein a portion of the bed side rail proximate the pocket opening is selectively disposed within the clamping region when the rotating plate is passed through the pocket opening and in the securing position, wherein the tie-down is selectively secured proximate the bed side rail.

16. The bull ring of claim 15, wherein the rotating plate includes a connecting flange configured to receive the fastener, wherein the connecting flange is substantially perpendicular to the rail flanges, and wherein the connecting flange does not extend beyond the outer edge of the top plate when the rotating plate is in the securing position.

17. The bull ring of claim 16, wherein the top plate includes a long axis, wherein the rail flanges extend beyond the outer edge when the rail flanges are positioned substantially perpendicular to the long axis, thereby defining the securing position, and wherein the top plate extends beyond the rail flanges and the connecting flange when the rotating plate is in an installation position.

18. The bull ring of claim 15, wherein the top plate defines a circular aperture within which a circular protrusion of the rotating plate is secured, wherein the circular protrusion is configured to rotate within the circular aperture such that the rotating plate selectively rotates relative to the top plate.

19. The bull ring of claim 18, wherein the rotating plate includes a support plate disposed within the circular protrusion, and wherein the support plate and the rotating plate are separate members coupled together by the tie-down, and wherein the tie-down is a U-shaped member extending through the support plate and the rotating plate.

20. The bull ring of claim 16, wherein the top plate and the connecting flange each define openings that cooperatively define a receptacle configured to receive the fastener when the rail flanges are in the securing position.

* * * * *